(12) United States Patent
Lorenzelli (10) Patent No.: US 8,218,692 B2
(45) Date of Patent: Jul. 10, 2012

(54) SIGNAL SEPARATOR

(75) Inventor: Flavio Lorenzelli, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 198 days.

(21) Appl. No.: 12/635,670

(22) Filed: Dec. 10, 2009

(65) Prior Publication Data

US 2011/0170637 A1    Jul. 14, 2011

(51) Int. Cl.
*H04L 27/06* (2006.01)
*H04L 27/22* (2006.01)
*H03D 1/04* (2006.01)

(52) U.S. Cl. .................. 375/341; 375/320; 375/329

(58) Field of Classification Search ............. 714/752, 714/794–796, 792; 702/85, 190–197; 342/380–384; 375/140, 144, 148, 265, 316, 349, 320, 324, 375/329, 341, 346–348; 704/231, 236, 242; 329/304, 315–320, 345, 347–348
See application file for complete search history.

(56) References Cited

U.S. PATENT DOCUMENTS

| | | | | |
|---|---|---|---|---|
| 5,363,412 A * | 11/1994 | Love et al. | ............. | 375/341 |
| 5,371,471 A * | 12/1994 | Chennakeshu et al. | ....... | 329/304 |
| 5,488,635 A * | 1/1996 | Chennakeshu et al. | ....... | 375/340 |
| 6,026,121 A | 2/2000 | Sadjadpour | | |
| 6,081,566 A * | 6/2000 | Molnar et al. | ............. | 375/347 |
| 6,910,177 B2 | 6/2005 | Cox | | |
| 7,058,422 B2 * | 6/2006 | Learned et al. | ............. | 455/526 |
| 7,330,801 B2 | 2/2008 | Goldberg et al. | | |
| 7,430,257 B1 * | 9/2008 | Shattil | ............. | 375/347 |
| 7,593,449 B2 * | 9/2009 | Shattil | ............. | 375/130 |
| 7,653,868 B2 * | 1/2010 | Haratsch | ............. | 714/796 |
| 7,844,003 B2 * | 11/2010 | Maeda et al. | ............. | 375/260 |
| 8,059,627 B2 * | 11/2011 | Hong et al. | ............. | 370/342 |
| 2004/0081074 A1 * | 4/2004 | Piechocki | ............. | 370/206 |
| 2006/0182195 A1 * | 8/2006 | Miller | ............. | 375/267 |
| 2009/0125793 A1 * | 5/2009 | Kishigami et al. | ............. | 714/794 |
| 2011/0268168 A1 * | 11/2011 | Dybdal et al. | ............. | 375/225 |

OTHER PUBLICATIONS

K. Giridhar, J.J. Shynk, A. Mathur, S. Chari, and R.P. Gooch, "Nonlinear techniques for the joint estimation of cochannel signals," IEEE J. Sel. Areas Commun., v. 45, n. 4, pp. 473-484, 1997.
M. Ghosh and C.L. Weber, "Maximum-likelihood blind equalization," Optical Engin., v. 31, n. 6, pp. 1224-1228, 1992.
K.-H. Chang and C.N. Georghiades, "Iterative joint sequence and channel estimation for fast time-varying intersymbol interference channels," in Proc. IEEE ICC, Jun. 1995, pp. 357-361.
G.K. Kaleh and R. Vallet, "Joint parameter estimation and symbol detection for linear or nonlinear unknown channels," IEEE Tr. Commun., v. 42, n. 7, pp. 2406-2413, 1994.
X.-M. Chen and P.A. Hoeher, "Trellis-based iterative adaptive blind sequence estimation for uncoded/coded systems with differential precoding," EURASIP J. Appl. Sig. Proc., v. 6, pp. 828-843, 2005.
Y. Bar-Ness and H. Bunin, "Co-channel interference suppression and signal separation method," in Proc. IEEE ICC, Jun. 1988, pp. 1077-1081.

(Continued)

*Primary Examiner* — Lawrence B Williams
(74) *Attorney, Agent, or Firm* — Paul D. Chancellor; Ocean Law (57) ABSTRACT

A device for separating uncoordinated co-channel signals including a symbol detector.

14 Claims, 9 Drawing Sheets

OTHER PUBLICATIONS

A. Duel-Hallen, "Equalizers for multiple input/multiple output channels and PAM systems with cyclostationary input sequences," IEEE J. Sel. Areas Commun., v. 10, pp. 630-639, 1992.

K.-W Cheong, W.-J. Choi, and J.M. Cioffi, "Multiuser soft interference canceler via iterative decoding for DSL applications," IEEE J. Sel. Areas Commun., v. 20, n. 2, pp. 363-371, 2002.

M.L. Honig, P. Crespo, and K. Steiglitz, "Suppression of near- and far-end crosstalk by linear pre- and post-filtering," IEEE J. Sel. Areas Commun., v. 10, pp. 614-629, 1992.

S.N. Diggavi, B.C. Ng, and A. Paulraj, "An interference suppression scheme with joint channel-data estimation," IEEE J. Sel. Areas Commun., v. 17, n. 11, pp. 1924-1939, 1999.

J.-F. Cardoso, "Blind signal separation: statistical principles," Proc. of IEEE, v.9, n. 10, pp. 2009-2025, 1998.

R. Raheli, A. Polydoros, and C.-K. Tzou, "Per-survivor processing: a general approach to MLSE in uncertain environments," IEEE Tr. Commun., v. 43, n. 2/3/4, pp. 354-364, 1995.

* cited by examiner

Channels  h1=[h10, h11] = [   1    0.5   ]
          h2=[h20, h21] = [   0.4  -0.3  ]

metric@k=metric@k-1+(expected output - received)^2
expected output = b1(h10) + s1(h11) + b2(h20) + s2(h21)

| Departing Branch | | Arriving Branch | | Time 0 | Time 1 | | | Time 2 | | |
|---|---|---|---|---|---|---|---|---|---|---|
| State s1 | State s2 | Symbol b1 | Symbol b2 | Metric | Arriving Expected Output | Metric | Survivors | Arriving Expected Output | Metric | Survivors |
| 1  | 1  | 1  | 1  | 0 | 1.6  | 0.6724 | 0.0324 | 1.6  | 4.9165 | 1.8005 |
| 1  | -1 | 1  | 1  | 0 | 2.2  | 2.0164 | 0.0004 | 2.2  | 7.8965 | 0.5045 |
| -1 | 1  | 1  | 1  | 0 | 0.6  | 0.0324 | 0.3364 | 0.6  | 1.8005 | 0.0765 |
| -1 | -1 | 1  | 1  | 0 | 1.2  | 0.1764 | 1.9044 | 1.2  | 5.1805 | 0.0005 |
| 1  | 1  | 1  | -1 | 0 | 0.8  | 0.0004 | 0.0324 | 0.8  | 2.0205 | 1.8005 |
| 1  | -1 | 1  | -1 | 0 | 1.4  | 0.3844 | 0.0004 | 1.4  | 4.0405 | 0.5045 |
| -1 | 1  | 1  | -1 | 0 | -0.2 | 0.9604 | 0.3364 | -0.2 | 0.5045 | 0.0765 |
| -1 | -1 | 1  | -1 | 0 | 0.4  | 0.1444 | 1.9044 | 0.4  | 2.9245 | 0.0005 |
| 1  | 1  | -1 | 1  | 0 | -0.4 | 1.3924 | 0.0324 | -0.4 | 0.0765 | 1.8005 |
| 1  | -1 | -1 | 1  | 0 | 0.2  | 0.3364 | 0.0004 | 0.2  | 0.6565 | 0.5045 |
| -1 | 1  | -1 | 1  | 0 | -1.4 | 4.7524 | 0.3364 | -1.4 | 0.9605 | 0.0765 |
| -1 | -1 | -1 | 1  | 0 | -0.8 | 2.4964 | 1.9044 | -0.8 | 1.9405 | 0.0005 |
| 1  | 1  | -1 | -1 | 0 | -1.2 | 3.9204 | 0.0324 | -1.2 | 0.3805 | 1.8005 |
| 1  | -1 | -1 | -1 | 0 | -0.6 | 1.9044 | 0.0004 | -0.6 | 0.0005 | 0.5045 |
| -1 | 1  | -1 | -1 | 0 | -2.2 | 8.8804 | 0.3364 | -2.2 | 2.8645 | 0.0765 |
| -1 | -1 | -1 | -1 | 0 | -1.6 | 5.6644 | 1.9044 | -1.6 | 2.8845 | 0.0005 |
| | | | Received | | 0.78 | | | -0.61 | | |

FIG. 7B

| Departing Branch | | Arriving Branch | | Time 0 | Time 3 | | | Time 4 | |
|---|---|---|---|---|---|---|---|---|---|
| State s1 | State s2 | Symbol b1 | Symbol b2 | Metric | Arriving Expected Output | Metric | Survivors | Arriving Expected Output | Metric |
| 1 | 1 | 1 | 1 | 0 | 1.6 | 11.8494 | 4.7854 | 1.6 | 6.1778 |
| 1 | -1 | 1 | 1 | 0 | 2.2 | 14.7174 | 1.9534 | 2.2 | 5.1218 |
| -1 | 1 | 1 | 1 | 0 | 0.6 | 4.7854 | 0.1054 | 0.6 | 0.1378 |
| -1 | -1 | 1 | 1 | 0 | 1.2 | 7.6734 | 0.0014 | 1.2 | 0.6098 |
| 1 | 1 | 1 | -1 | 0 | 0.8 | 7.4174 | 4.7854 | 0.8 | 4.9298 |
| 1 | -1 | 1 | -1 | 0 | 1.4 | 9.3254 | 1.9534 | 1.4 | 2.9138 |
| -1 | 1 | 1 | -1 | 0 | -0.2 | 1.9534 | 0.1054 | -0.2 | 0.4898 |
| -1 | -1 | 1 | -1 | 0 | 0.4 | 3.8814 | 0.0014 | 0.4 | 0.0018 |
| 1 | 1 | -1 | 1 | 0 | -0.4 | 3.1694 | 4.7854 | -0.4 | 5.4578 |
| 1 | -1 | -1 | 1 | 0 | 0.2 | 3.6374 | 1.9534 | 0.2 | 2.0018 |
| -1 | 1 | -1 | 1 | 0 | -1.4 | 0.1054 | 0.1054 | -1.4 | 3.4178 |
| -1 | -1 | -1 | 1 | 0 | -0.8 | 0.5934 | 0.0014 | -0.8 | 1.4898 |
| 1 | 1 | -1 | -1 | 0 | -1.2 | 1.9374 | 4.7854 | -1.2 | 7.4098 |
| 1 | -1 | -1 | -1 | 0 | -0.6 | 1.4454 | 1.9534 | -0.6 | 2.9938 |
| -1 | 1 | -1 | -1 | 0 | -2.2 | 0.4734 | 0.1054 | -2.2 | 6.9698 |
| -1 | -1 | -1 | -1 | 0 | -1.6 | 0.0014 | 0.0014 | -1.6 | 4.0818 |
| | | | | Received | -1.57 | | | 0.42 | |

FIG. 7C

SIGNAL SEPARATOR

STATEMENT OF GOVERNMENT INTEREST

The invention was made with Government support under contract No. F04701-00-C-0009 by the Department of the Air Force. The Government has certain rights in the invention.

BACKGROUND OF THE INVENTION

1. Field of the Invention

The present invention relates to a device and a process for separating digital signals embedded in a single received signal.

2. Discussion of the Related Art

Separating uncoordinated co-channel signals of comparable power from a single received signal impaired by one or more of intersymbol interference, mutual interference, and additive noise without the aid of matched filters or another traditional means of signal separation is a rare area of research and development. Techniques modifying transmitted signals to aid subsequent separation are the workhorses of modern day communications and it is their improvement that has dominated signal separation research and development.

SUMMARY OF THE INVENTION

The signal separation device and method of the present invention includes embodiments for separating uncoordinated co-channel signals of comparable power from a single received signal impaired by one or more of intersymbol interference, mutual interference, and additive noise.

In an embodiment, a method comprises the steps of: implementing an initial channel estimator, a blind maximum likelihood symbol detector, and a least squares channel estimator in one or more digital processors; converting the received signal in an analog to digital converter, the sample rate of the converter exceeding the symbol rate by a factor greater than or equal to two; utilizing the initial channel estimator to make an initial set of channel estimates from the converted received signal; producing a data block by decimating the converted received signal; detecting symbols from the data block in a multi-signal trellis of the blind maximum likelihood symbol detector using the most recent channel estimates; utilizing the least squares channel estimator to make another set of channel estimates from the detected symbols; returning to the detecting step if the channel estimates have not converged; comparing the trellis end survivors' metrics to determine if the detected symbols should be accepted; returning to the first utilizing step and revising the initial channel state information if the detected symbols are not accepted; and, accepting the detected symbols and returning to the producing step if data remains.

In an embodiment, first and second digitally modulated signals are simultaneously transmitted in overlapping frequency bands. Signals corresponding to the first and second signals are transported by a common transmission medium. The transported signals differ in at least one of carrier frequency, carrier phase, delay and impulse response, and are embedded in a signal received from the transmission medium. An analog to digital converter processes the received signal, the sample rate of the converter exceeding the symbol rate by a factor greater than or equal to two. An initial channel estimator is coupled to an output of the analog to digital converter for making an initial estimate of carrier frequency, carrier phase, delay, and impulse response of the first and second signal channels. A decimator is coupled to an output of the analog to digital converter and a block selector is coupled to an output of the decimator. A blind maximum likelihood detector utilizes first channel estimator and block selector outputs to detect symbol sequences corresponding to the first and second signals. A least squares channel estimator utilizes the detected symbol sequences to estimate the carrier phase, delay and impulse of the first and second signal channels. The detector and least squares channel estimator operates to iteratively estimate symbol sequences and channel state information until changes in one or more of carrier phase, delay, and impulse response indicate convergence. Where convergence is indicated, metrics available from the detector operative to indicate whether the detected bit sequences should be accepted, or rejected in favor of revising the initial channel state information and restarting iterative symbol detection and channel estimation.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages describes selected embodiments of the invention. The designs, figures, and description are provided for the purpose of teaching a person of ordinary skill in the art, by way of example and not limitation, how to make and use the claimed invention. For example, other embodiments of the disclosed systems and methods may or may not include the features described herein. Moreover, disclosed advantages and benefits may apply to only certain embodiments of the invention and should not be used to limit the disclosed invention.

This application incorporates by reference U.S. Pat. No. 6,026,121 to Sadjadpour filed Jul. 25, 1997 for all purposes including the disclosure of columns 2-7 relating to utilization of least squares methods. This application incorporates by reference U.S. Pat. No. 6,910,177 to Cox filed Dec. 21, 2001 for all purposes including the disclosure of columns 2-5 relating to utilization of Viterbi algorithm methods and the disclosure of columns 6-9 relating to utilization of trellises. This application incorporates by reference U.S. Pat. No. 7,330,801 to Goldberg et al. filed Jul. 31, 2006 for all purposes including the disclosure of columns 7-9 relating to signal separation.

Included in the invention are a channel estimator and a detector for separating multiple signals from a single received signal. The channel estimator and detector are useful for, inter alia, separating uncoordinated co-channel signals of comparable power from a single received signal impaired by one or more of intersymbol interference, mutual interference, and additive noise.

Figure 1:
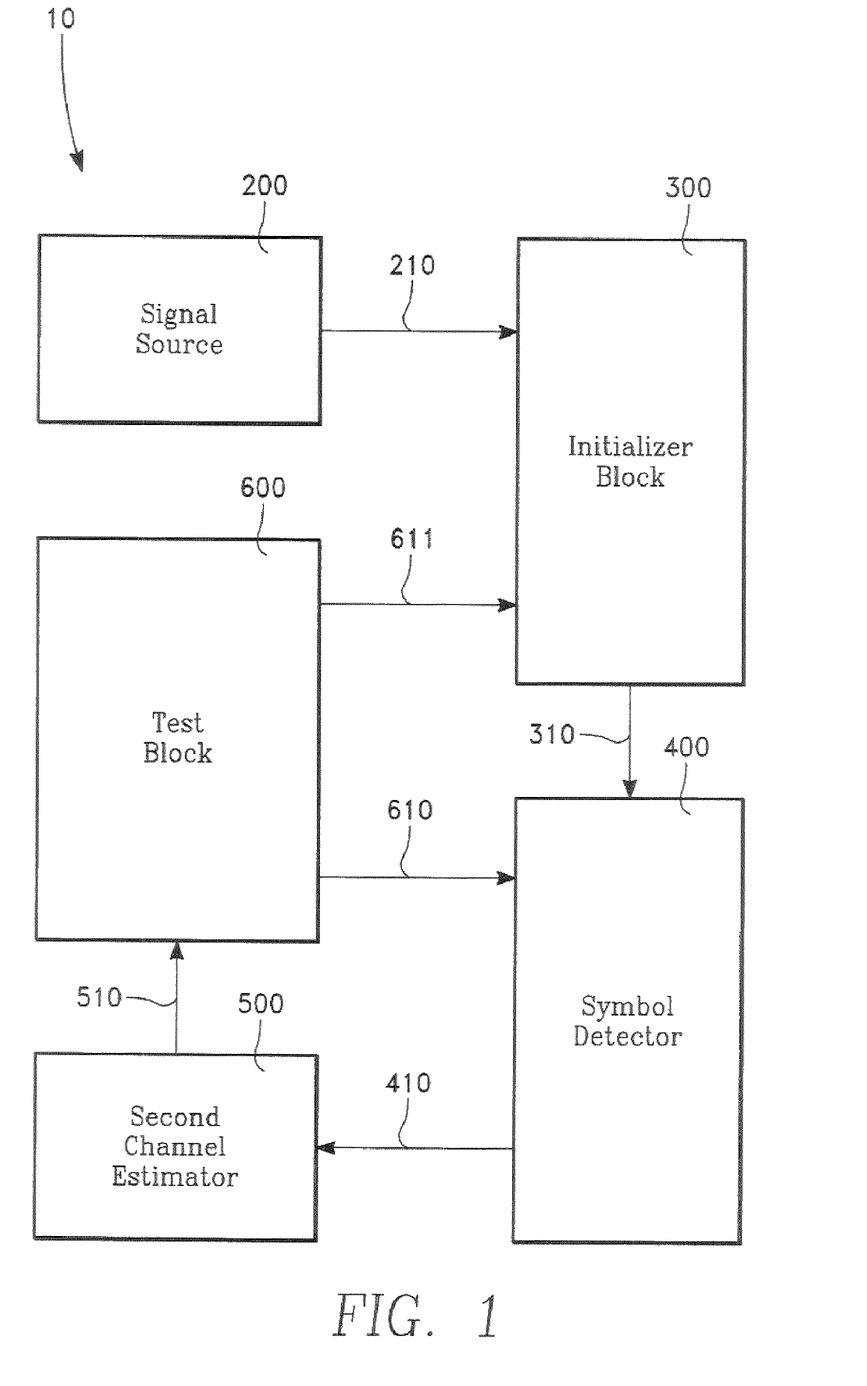
FIG. 1 is a block diagram of a signal separator in accordance with the present invention.

FIG. 1 shows a signal separator receiving a signal from a signal source in accordance with the present invention 10. A symbol detector 400 is coupled with each of a signal source 200, an initializer block 300 and a test block 600. A second channel estimator 500 is similarly coupled with the symbol detector and the test block. As used herein, coupled means directly or indirectly connected by a suitable means known to persons of ordinary skill in the art, such as wired, wireless, optical, and other known tangible and intangible connections.

Signals or information derived from the signal source 200 are passed to the initialization block from a signal source output 210 and one or more outputs 310 of the initialization block 300 are coupled for signal communication to the symbol detector 400. As used herein, passed means directly or indirectly transported via a suitable means known to persons of ordinary skill in the art such as by wired, wireless, optical and other known tangible and intangible transport means.

Symbols detected in the symbol detector 400 are passed to the second channel estimator from a symbol detector output 410. Channel estimates or information derived from the second channel estimator is then passed to the test block 600 from a second channel estimator output 510.

Symbols or information derived from the test block 600 are passed to the symbol detector 400 from a first output of the test block 610. Symbols or information derived from the test block 600 are also passed to the initializer block 300 from a second output 611 of the test block.

Figure 2:
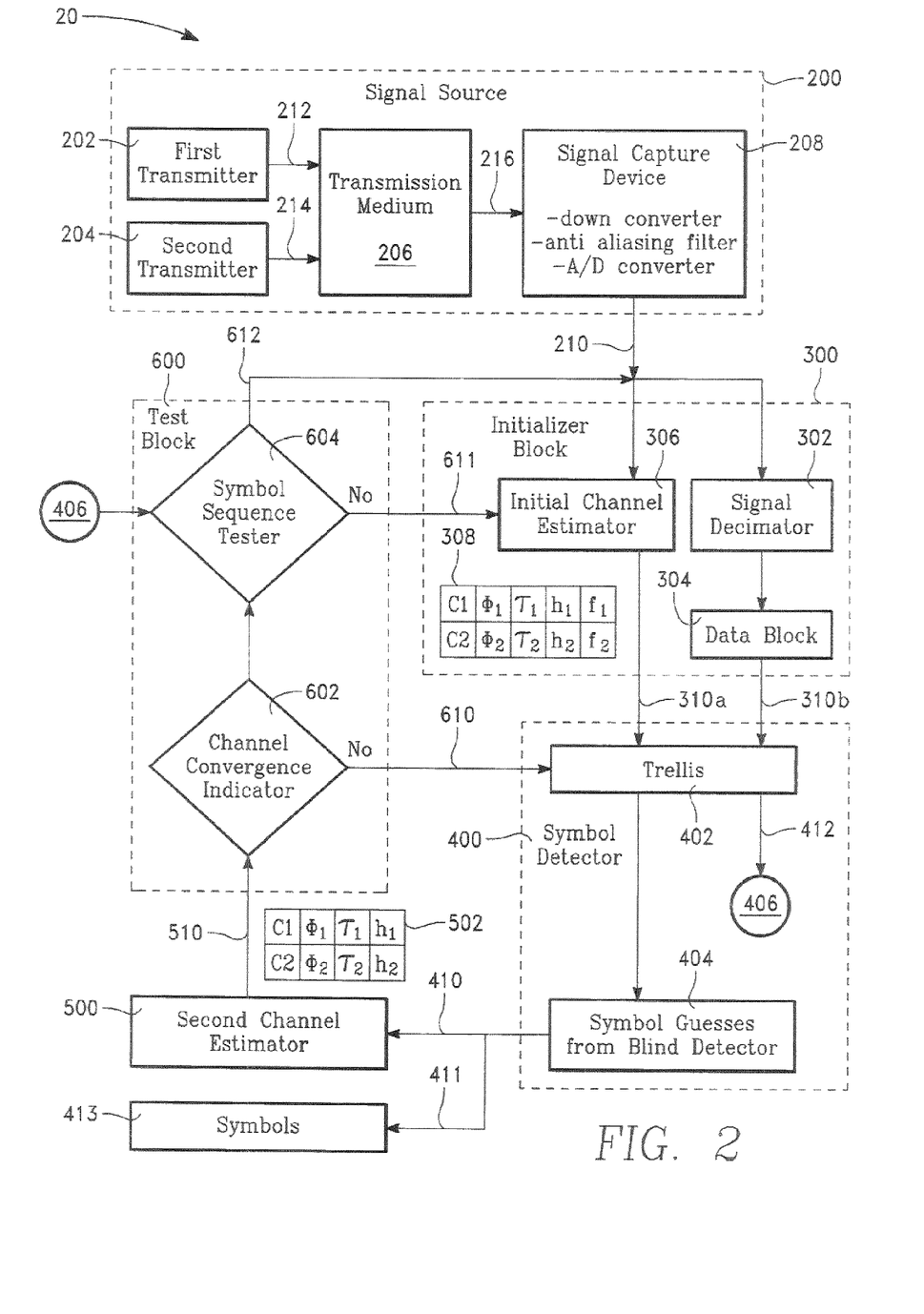
FIG. 2 is a block diagram of the signal separator of FIG. 1.

FIG. 2 shows additional details 20 of the signal separator of FIG. 1. Signal source 200 includes a plurality of transmitters 202, 204 generating respective output signals Signal 1 212, and Signal 2 214. While the system and method of the present invention are applicable to separating more than two signals embedded in a single received signal, examples herein assume separation of two signals.

Signals 1 and 2 are transported using a common transmission means or medium 206 such as a wired, wireless, light conducting, and other known tangible or intangible media. A signal capture device 208 of the signal source such as a radio frequency receiver receives a single signal 216 that includes information from each of the transmitted signals.

Figure 3:
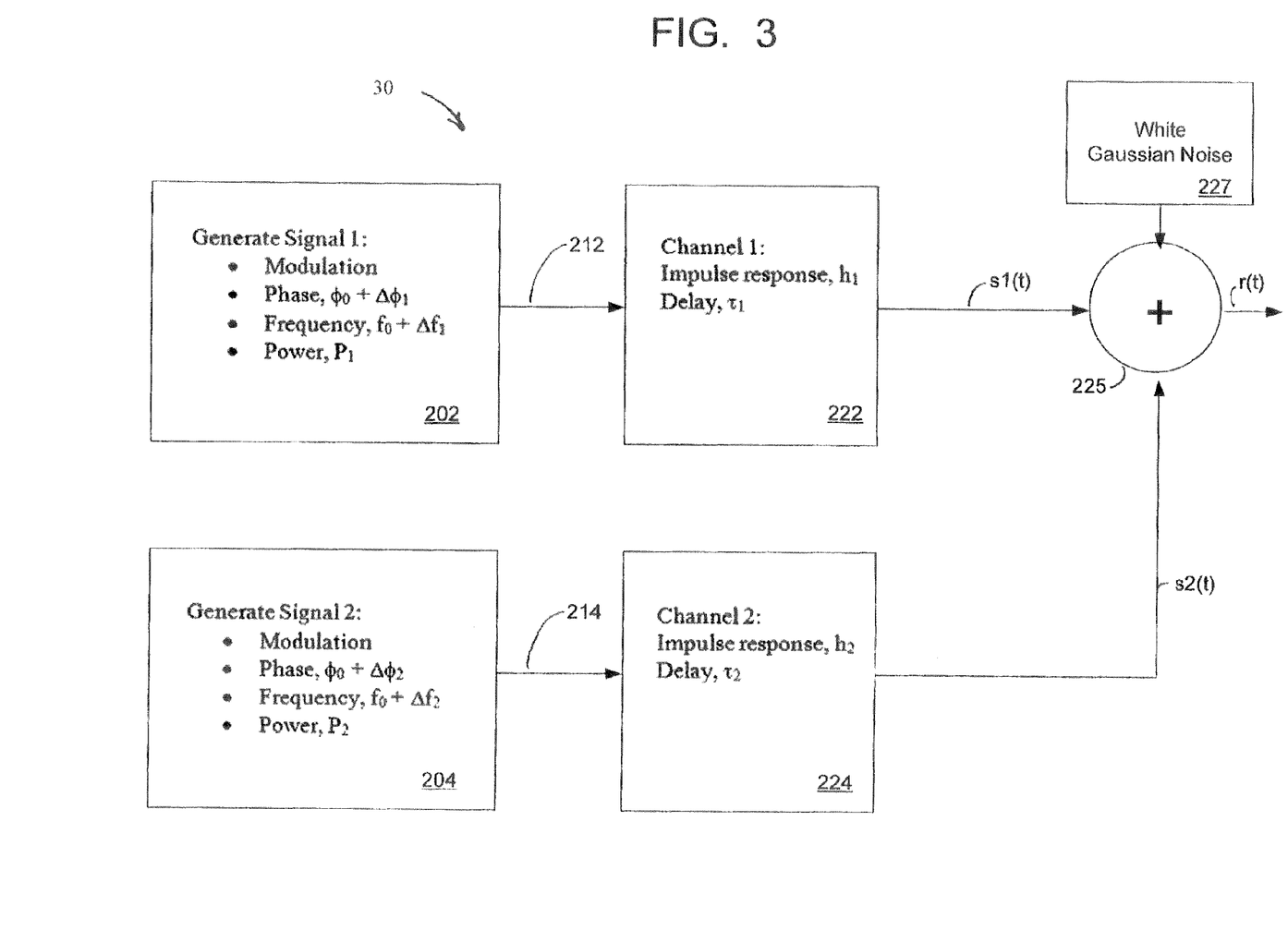
FIG. 3 is a block diagram of a co-channel signal model of the signal separator of FIG. 1.

FIG. 3 shows a co-channel signal model for the transmitters and transmission medium 30. Signals 1 and 2 212, 214 are generated when two symbol streams modulate two carriers. These generated signals are characterized by respective modulation, phase ($\phi_0+\Delta\phi$), frequency ($f_0+\Delta f$), and power (P) parameters. Corresponding channels 222, 224 are characterized by impulse response (h) and delay ($\tau$) parameters. A received signal r(t) is modeled by summing 225 signals $s_1(t)$ and $s_2(t)$ of the respective channels and noise n(t), such as additive white Gaussian noise (AWGN) 227 assumed to be added to the signal by the channels.

In the present invention plural signals of interest are embedded in the received signal 216 and it is differences between these signals that enable signal separation. In general, the signals are not required to be temporally aligned or in phase with each other; the carrier signal frequencies can differ within a range even though the frequency offset is not known at the signal capture device or receiver 208; and, no matched filtering is assumed.

In an embodiment the nominal data rates are assumed known, but the actual data rates are estimated from the received data. In various embodiments, the embedded signals may overlap in time and/or frequency and may be impaired by one or more of intersymbol interference (ISI), mutual interference, and additive noise.

The signal capture device 208 provides a digital representation ($r_0, r_1, r_k, \ldots$) of the received signal r(t) at an output 210. In various embodiments, the signal capture device includes one or more of an antenna, a down converter, an anti-aliasing filter, and an Analog-to-Digital (A/D) Converter. For example, a device for capturing a satellite signal can include all of these components. In embodiments without matched filtering, oversampling is employed to compensate for the lack of a matched filter at the signal capture device 208. Oversampling makes the algorithm of second channel estimator 500 more robust to symbol-timing misalignments. Among other things, oversampling allows the capture of "sufficient statistics" from the received signal and enables channel estimation without knowledge of the channel impulse response.

In some embodiments, A/D converter sample rates are greater than two times the data rate. For example, embodiments sampling intermediate frequencies (IF) utilize sample rates in the range of two to ten times the data rate.

From the signal capture device, digital data ($r_0, r_1, \ldots r_k, \ldots$) is passed to the initializer block 300 where an initial channel estimate is made and data is suitably formatted for the detector 400.

Channel estimation by an initial channel estimator 306 provides initial guesses for channel parameters 308 that will be used by the detector 400. For example, for the case of two channels with two taps each, a first estimate is $_{h1}=[1,0]$ and $_{h2}=[1,0]$, a second estimate is $_{h1}=[1,0]$ and $_{h2}=[0,1]$, a third estimate is $_{h1}=[0,1]$ and $_{h2}=[1,0]$, and a fourth estimate is $_{h1}=[0,1]$ and $_{h2}=[0,1]$. In some embodiments, the initial condition can be given by two channel impulse responses with a single non-zero tap each. This will take care of h and $\tau$ (the delay being the position of the non-zero tap). As for $\phi$ and f, they will be estimated by the second channel estimator 500, unless prior information can be used; for instance, if this is not the first data block, a good initial estimate for $\phi$ and f are the values estimated in the previous block.

Data formatting provides a digital representation of the received signal r(t) suited for use by the detector. In an embodiment, data provided to the detector 310b is formatted by a decimator 302 that decimates the data ($r_0, r_1, r_k, \ldots$). And, in some embodiments, the data is formatted into data blocks 304 for block detection, each data block corresponding to N symbols in the original signals 212, 214. As shown in FIG. 2, the decimated data is formatted into blocks suited for block detection algorithms. In other embodiments the data is formatted for symbol by symbol detection.

From the initialization block 300, the initial channel estimates 310a and the data block 310b are passed to a detector 400 for symbol detection. Detected symbols are passed to the second channel estimator 500 from an output of the detector 410.

Various symbol detection and channel estimation algorithms may be used. These include 1) joint maximum-likelihood (ML) channel estimation and block sequence detection procedure, 2) joint maximum-a-posteri (MAP) symbol-by-symbol detection with least mean square LMS or recursive least square (RLS) channel estimation and tracking, or 3) Viterbi sequence detection with per-survivor LMS or RLS channel estimation and tracking. In some embodiments, LMS and RLS techniques are used in conjunction with the second channel estimator 500. Here, the channel estimation operation cannot be neatly separated from the trellis 402; each trellis state would have its own LMS/RLS channel estimator, and the trellis 402 and second channel estimator 500 would work in synergy. In some embodiments, the second channel estimator 500 could be eliminated.

In an embodiment, an iterative joint maximum-likelihood (ML) channel estimation and block sequence detection procedure is used. Here, the detector's 400 states are augmented to include the memory of the two signals' channels (impulse responses) and the memory provided by the channel codes, if present. The second channel estimator 500 is used to provide the sequence detector with information about the symbol timing, phase offset, and generally the channel impulse responses experienced by the two incoming signals.

In particular, this embodiment includes a blind Viterbi detector 400 implementing a block maximum likelihood (ML) algorithm in the assumption that the received signal is buried in Gaussian noise. A trellis structure 402 in the Viterbi detector 400 combines the memory of the two signals, i.e., the two impulse responses as seen by the two signals and the redundancy due to the channel code, if present. In various embodiments, the detected symbols are made available from and/or stored in the symbol detector 404.

Figure 4:
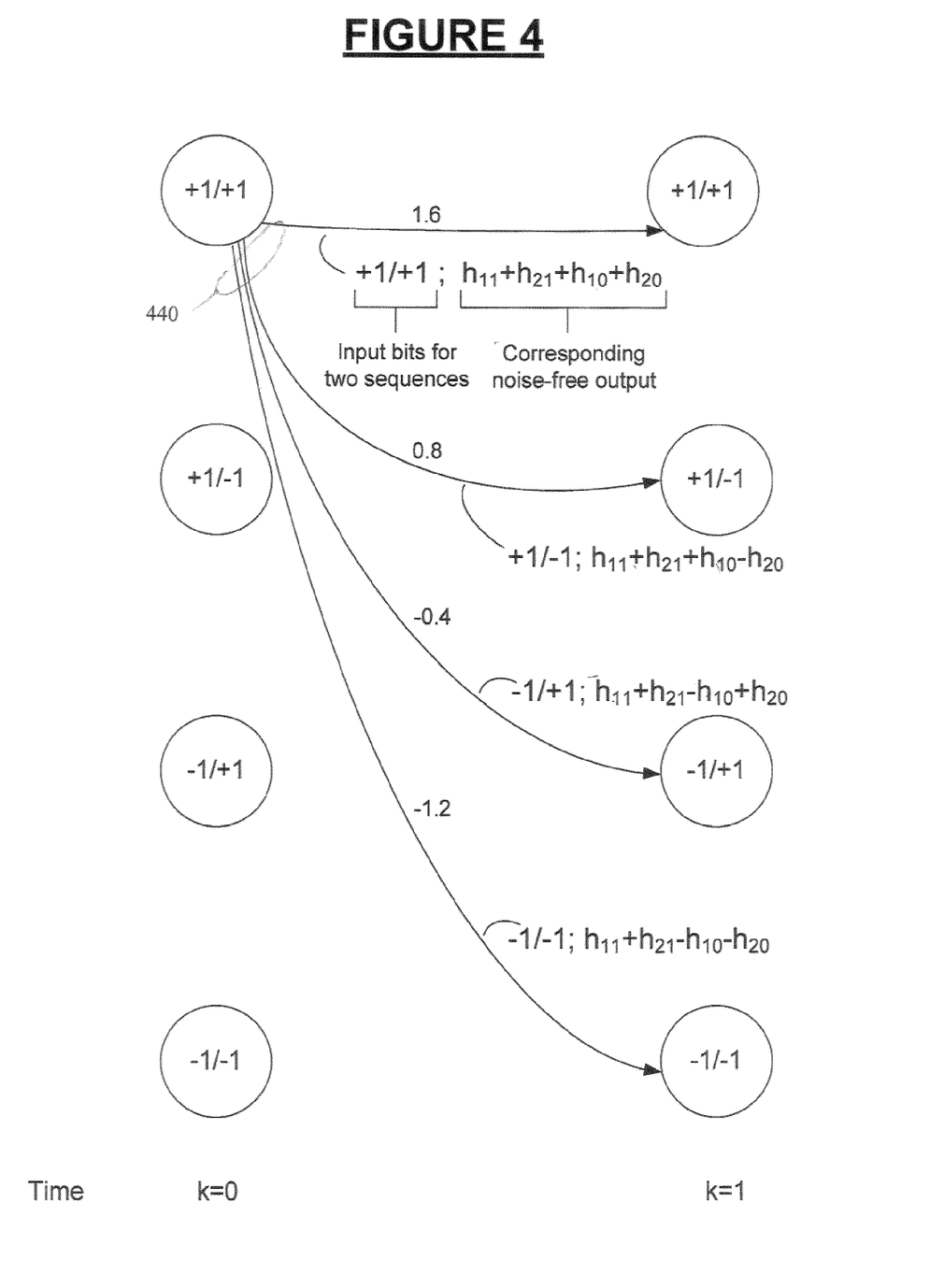
FIG. 4 depicts an exemplary slice of a trellis of the signal separator of FIG. 1.

FIG. 4 shows a slice of a trellis 402 implementing a joint maximum likelihood detector that corresponds to transmission of two bits. As shown in this embodiment, the figure refers to binary modulation, two channels of memory and no oversampling. As will be appreciated by a person of ordinary skill in the art and as further discussed herein, other embodiments may include one or more of oversampling, different modulation, and different memory channels.

The exemplary trellis structure shown assumes there are two channels, $h_1$, $h_2$, and that they are known such that $h_1 = [h_{10}, h_{11}]$ and $h_2 = [h_{20}, h_{21}]$. Here, the subscript x0 indicates the current value of the $x^{th}$ channel tap and the subscript x1 indicates the prior value of the $x^{th}$ channel tap.

The states at the left side of the trellis are possible values of the previously sent bits while the states at the right side of the trellis are the possible values of the currently received bits. As can be seen, the number of channels and channel taps per channel determines the structure of the trellis.

States of the trellis $[s_1/s_2]$ correspond to all of the values that two binary signals can take on; +1/+1, +1/−1, −1/+1 and −1/−1. The exemplary trellis slice of FIG. 4 therefore shows the possible values that two binary signals can take on at two different times k=0 and k=1, each time being indicated by a vertical column of possible states.

Branches from one trellis column (time k=0) to the next (time k=1) are associated with received bits $[b_1, b_2]$. In this case, a transition from a particular prior state to a current state can occur along any of four trellis branches depending on the bits received. An expected output is associated with each branch and is a function the current state $[S_1, s_2]$, the received bits/incoming symbols $[b_1, b_2]$, and the channels $[h_{x0}, h_{x1}]$:
Expected Output=$s_1 h_{11} + s_2 h_{21} + b_1 h_{10} + b_2 h_{20}$.

For example, from state +1/+1 there are four possible transitions or branches given four possible sets of incoming symbols. In each case, there is an expected output as shown below.

| Incoming Symbols | Expected Output |
| --- | --- |
| +1/+1 | $h_{11} + h_{21} + h_{10} + h_{20}$ |
| +1/−1 | $h_{11} + h_{21} + h_{10} - h_{20}$ |
| −1/+1 | $h_{11} + h_{21} - h_{10} + h_{20}$ |
| −1/−1 | $h_{11} + h_{21} - h_{10} - h_{20}$ |

Because all of the possible combinations of two binary signals (+1/+1, +1/−1, −1/+1 and −1/−1) are represented in each trellis column, a trellis having a depth (number of columns) equal to one plus the number of symbol pairs received can represent every possible sequence received. The paths along interconnected trellis branches identify unique symbol sequences.

Figure 5:
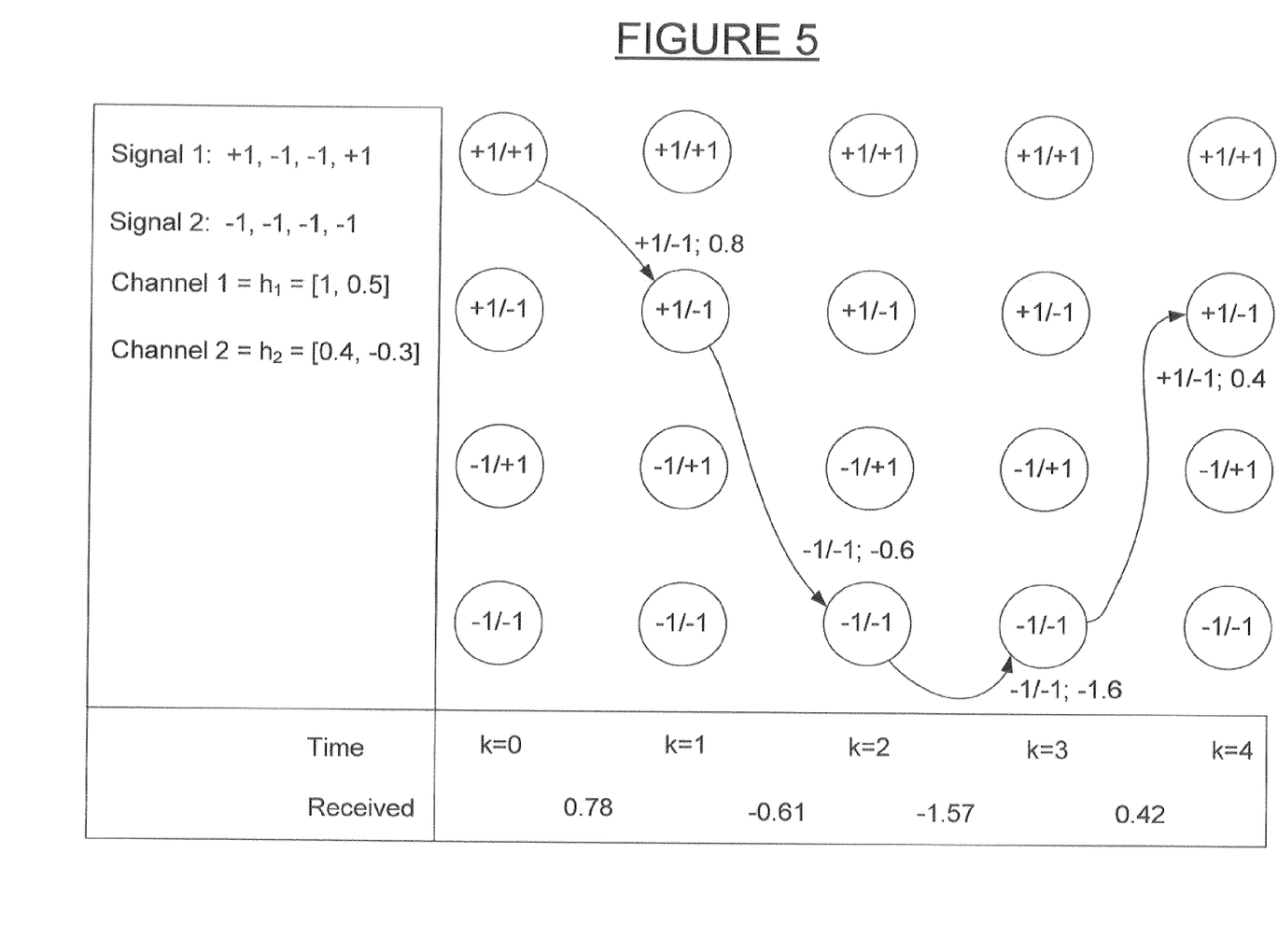
FIG. 5 depicts an expanded trellis of the signal separator of FIG. 1.

FIG. 5 shows the trellis of FIG. 4 expanded to accommodate four sets of bits received from two channels. In the example shown, the channel estimates are $h_1=[1, 0.5]$ and $h_2=[0.4, -0.3]$ and the received sequence y(t) is 0.78, −0.61, −1.57 and 0.42.

Because the trellis incorporates every possible sequence of symbols, detection requires identifying a particular path through the trellis corresponding to the received sequence. FIG. 5 shows the most probable path through the trellis as +1/+1, +1/−1, −1/−1, −1/−1, +1/−1 given the channel estimates $h_1$, $h_2$ and the received sequence y(t).

Any suitable probability method known to persons of ordinary skill in the art may be used to identify the most likely trellis path. In some embodiments, trellis path probabilities are identified where each possible path has a path metric equal to the sum of the metrics for each branch in the path. And, in an embodiment branch metrics are based on a negative log-likelihood function (assuming, for example, AWGN), such that smaller values of the metric indicate higher probabilities. Here, it follows that the path through the trellis with the smallest path metric identifies the most probable path and thus the symbols most likely received at the signal capture device 208.

Figure 6:
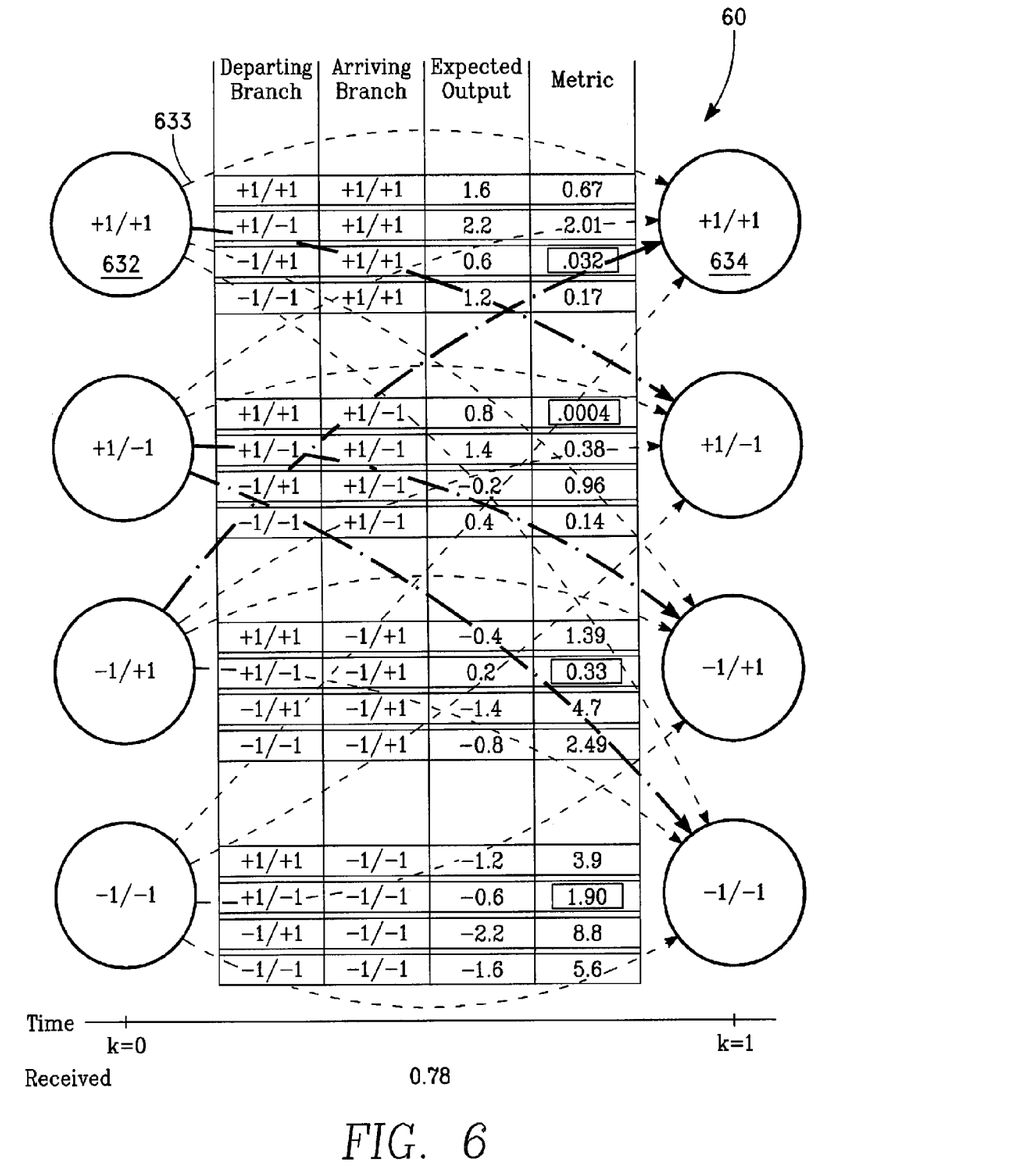
FIG. 6 illustrates a method of selecting a path through a trellis of the signal separator of FIG. 1.

FIG. 6 illustrates a method 60 of selecting a most likely path from a trellis slice for time k=0 to a trellis slice for time k=1 where the received value is 0.78. An appropriate negative log-likelihood function is LLF=(expected output−received value)$^2$ such that the Metric$_k$=Metric$_{k-1}$+(expected output−received value)$^2$. As persons of ordinary skill in the art will appreciate, (expected output−received value)$^2$ is the negative of the exponent of the normal (or Gaussian) density function, which is the assumed density of the noise (additive Gaussian noise). The negative log-likelihood function is the logarithm of the density function, multiplied by −1.

As shown in the figure, each departing state 632 has four departing branches 633 extending to four different arriving states 634. In similar fashion, each arriving state 634 has four arriving branches 635 extending from four different departing states 632. Shown between the departing and arriving states are exemplary expected outputs and metrics at the arriving state.

Not all of the sixteen arriving branches need to be carried forward. Rather, including only the branch with the lowest valued metric at each state is sufficient to discover the most probable path through the trellis. Such branches are commonly termed "survivors" and as seen in this example they have values of 0.32, 0.0004, 0.33 and 1.90 (see boxes). As persons of ordinary skill in the art will appreciate, this follows from the Viterbi algorithm: because positive metrics add as one proceeds in the trellis, any path that goes through state +1/+1 (See 634 in FIG. 6) would have an accumulated metric no smaller than the one that at time k=1 has metric 0.032, therefore the three paths that have higher metrics at time k=1 can be safely dropped as they have no chance of surviving.

Figure 7A:
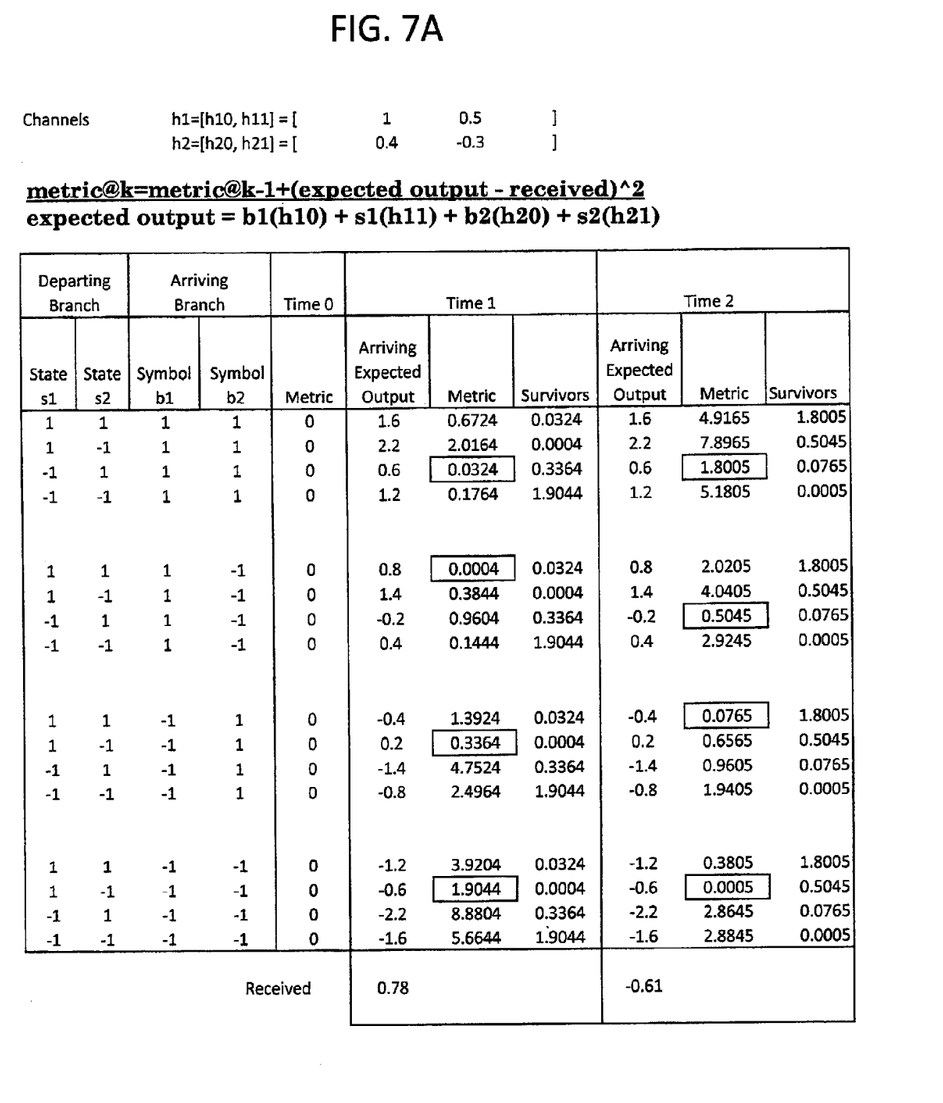
FIGS. 7A and 7B show calculations for a trellis of the signal separator of FIG. 1.
Figure 7B:
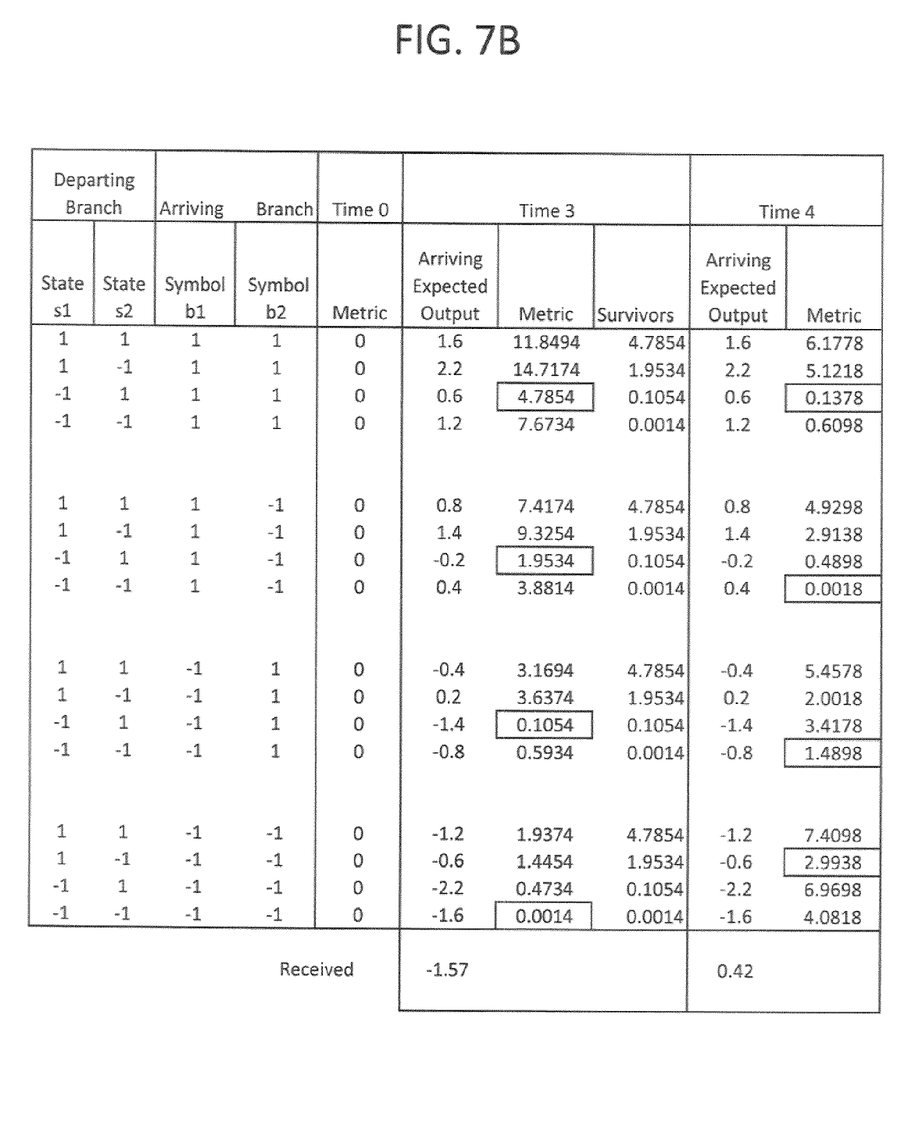

FIGS. 7A and 7B show trellis calculations for the exemplary trellis at times k=0, 1, 2, 3 and 4. Like FIG. 6, at time k=1, the metrics column shows the metrics and the survivors (see boxes) for each arriving branch.

At time k=2, the metrics are calculated for each possible branch from each survivor at time k=1 (in this example, 4*4 or 16 metrics are calculated for each received value). For example, 0.0324 is the value of the survivor corresponding to state +1/+1 at time k=1 and its possible new branches are to states +1/+1, +1/−1, −1/+1, and −1/−1 at time k=2. As seen in FIG. 7A, the metrics for these new branches are 4.9165, 2.0205, 0.0765 and 0.3805.

Trellis calculations proceed in similar fashion until a trellis end is reached. As can be seen in FIG. 7B, the trellis end survivors at time k=4 are 0.1378, 0.0018, 1.4898 and 2.9938.

Figure 7C:
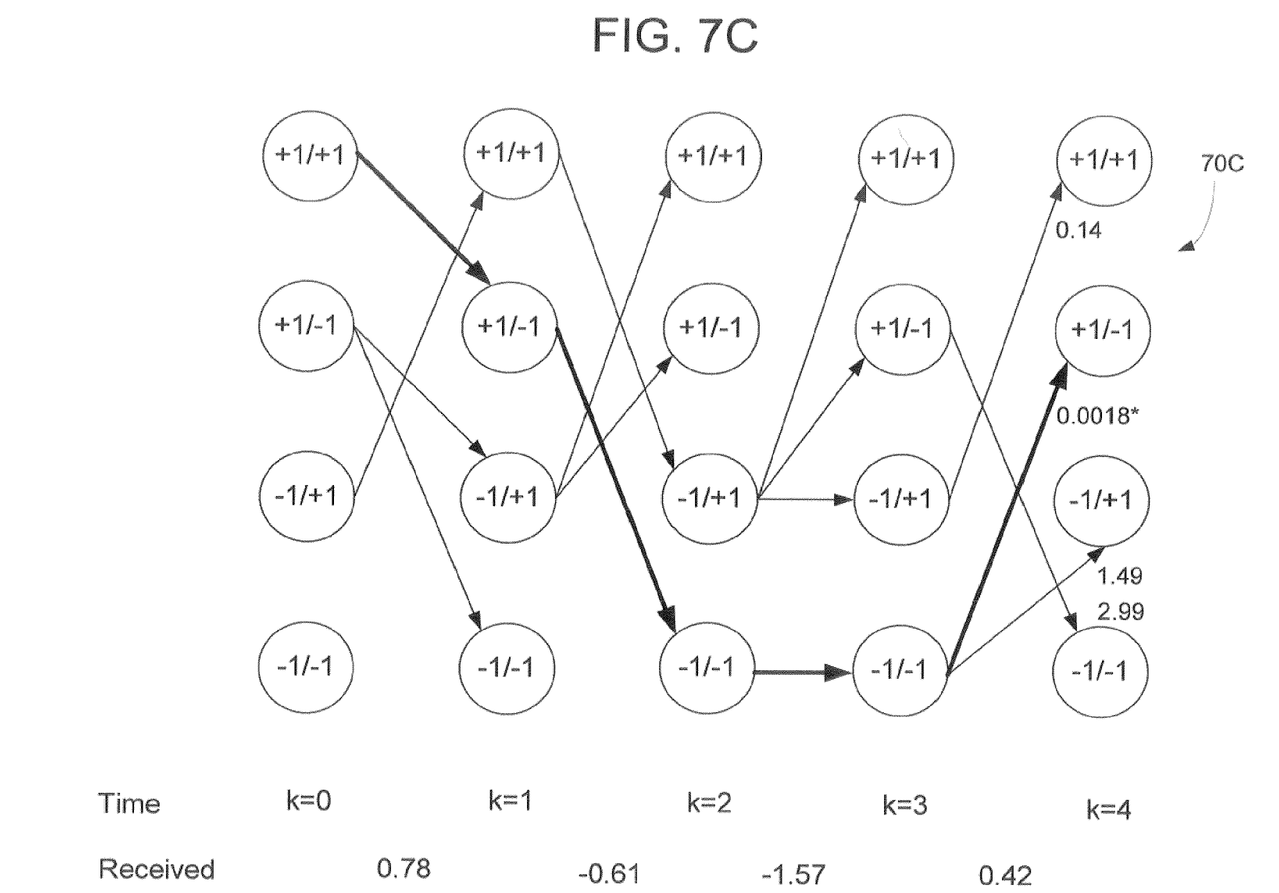
FIG. 7C depicts trellis end survivors for a trellis of the signal separator of FIG. 1.

FIG. 7C shows each of the four survivors at each state and in particular the four survivors at the final state 70C. Because the most probable path corresponds to the smallest cumulative metric, the path with metric 0.0018 is the winning path. This path identifies a unique sequence of symbol pairs +1/−1, −1/−1, −1/−1, and +1/−1. The detected signals are therefore Detected Signal 1: +1, −1, −1, +1 and Detected Signal 2: −1, −1, −1, −1.

Symbols detected by the detector are passed to the second channel estimator 500 where a channel estimate ($\phi$, $\tau$, h, f) for each channel is produced 502. In an embodiment, the channel is estimated by a least squares (LMS) estimator, itself a maximum likelihood estimator in the Gaussian noise assumption. Sequence detection and channel estimation are iterated and tested as described below.

Referring again to FIG. 2, a channel convergence tester 602 of the test block 600 monitors channel estimates 502 for convergence of the estimates made for each channel. If one or both channels fail the convergence test, another iteration is performed where the last channel estimates 502 are passed to the detector and the same block of data is processed again, along with the updated channel estimates.

For example, this test can be given by the comparison of the estimated channel impulse response (inclusive of delay, phase, and frequency) at the current time and the one at the previous time. If there has been no appreciable change (e.g., norm of the difference is less than a user-defined threshold), then convergence has been reached.

Suitable channel convergence tests include those known to persons of ordinary skill in the art and in particular include convergence tests based on differences between successive estimates of a) one or more channel parameters or b) combinations of two or more channel parameters. For example, in an embodiment, the norm or two-norm of the difference of successive channel impulse responses indicates convergence when it falls below a threshold value. And, in some embodiments the threshold is based on an estimated (or expected) value of the signals' amplitudes so exact knowledge of the signals 212, 214 is not required.

If the estimates for each channel have converged, a symbol sequence tester 604 of the test block 600 operates to test the goodness of the symbol detection.

The goodness of the symbol detection may be assessed using any means known to persons of ordinary skill in the art. For example, in various embodiments trellis metrics are passed 406 to the symbol sequence tester 604 from a detector trellis output 412. And, in some embodiments the symbol sequence tester evaluates the goodness of the symbol detection by comparing the trellis end survivors' metrics. In an embodiment, the symbol sequence detector looks at the survivors' metrics to determine if there is a clear winner.

In an embodiment, the symbol detection is accepted if the smallest trellis end survivor, the one representing the winning path, differs from other trellis end survivors by a factor greater than "r". The factor "r" is user-defined and frequently lies in a range of about 2 to 10. In some embodiments, the factor "r" may be in a broader range of about 2 to 20. For example, in the above exemplary trellis the winning path metric is 0.0018; as compared with the next closest trellis end survivor, 0.14, these values differ by a factor greater than 70. In this case, the goodness of the symbol detection is proved and the symbols would be accepted.

Where the goodness of the symbol detection is shown by trellis metrics 406 or otherwise, the detected symbols are accepted and control returns to the initialization block 300. In the initialization block, another block of data 304 is formatted and passed to symbol detector 400 where the iterative process starts again using the most recent channel estimates from the second channel estimator 500. In some embodiments accepted symbols are passed to a symbol memory device 413 via an output 411 of the symbol detector 400.

As persons of ordinary skill in the art will recognize, some or all of the functions of the initializer block 300, symbol detector 400, second channel estimator 500, and test block 600 can be implemented in one or more software controlled devices. Such devices include one or more of digital processors, digital signal processors, integrated circuits, computers, and field programmable gate arrays including general or special purpose versions of any of these devices.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A method for separating uncoordinated co-channel signals of comparable power from a single received signal impaired by one or more of intersymbol interference, mutual interference, and additive noise comprising the steps of:
   implementing an initial channel estimator, a blind maximum likelihood symbol detector, and a least squares channel estimator in one or more digital processors;
   converting the received signal in an analog to digital converter, the sample rate of the converter exceeding a symbol rate by a factor greater than or equal to two;
   utilizing the initial channel estimator to make an initial set of channel estimates from the converted received signal;
   producing a data block by decimating the converted received signal;
   detecting symbols from the data block in a multi-signal trellis of the blind maximum likelihood symbol detector using the most recent set of channel estimates;
   utilizing the least squares channel estimator to make another set of channel estimates from the detected symbols;
   returning to the detecting step if the channel estimates have not converged;
   comparing trellis end survivor's metrics to determine if the detected symbols should be accepted;
   returning to the first utilizing step and revising the initial channel state information if the detected symbols are not accepted; and,
   accepting the detected symbols and returning to the producing step if data remains.

2. The method of claim 1 where joint maximum-a-posteriori symbol-by-symbol detection with least square channel estimation and tracking is substituted for the blind maximum likelihood symbol detection and least squares channel estimation.

3. The method of claim 1 where Viterbi sequence detection with per-survivor least square channel estimation and tracking is substituted for the blind maximum likelihood symbol detection and least squares channel estimation.

4. A device for separating uncoordinated co-channel signals of comparable power from a single received signal impaired by one or more of intersymbol interference, mutual interference and additive noise, the device comprising:
- an analog to digital converter for processing the received signal, a sample rate of the converter exceeding a symbol rate corresponding to the received signal by a factor greater than or equal to two;
- an initial channel estimator coupled to an output of the analog to digital converter, said estimator for making an initial estimate of carrier frequency, carrier phase, delay, and impulse response of first and second channels transporting respective first and second signals;
- a decimator coupled to an output of the analog to digital converter and a block selector coupled to an output of the decimator;
- a blind maximum likelihood detector for utilizing initial channel estimator and block selector outputs to detect symbol sequences corresponding to the first and second signals;
- a least squares channel estimator for utilizing the detected symbol sequences to estimate the carrier phase, delay, and impulse of the first and second channels;
- the detector and least squares channel estimator operative to iteratively estimate symbol sequences and channel state information until changes in one or more of carrier phase, delay, and impulse response indicate convergence; and,
- where convergence is indicated, metrics available from the detector operative to indicate whether the detected symbol sequences should be accepted, or rejected in favor of revising initial channel state information and restarting iterative symbol detection and channel estimation.

5. The device of claim 4 where a joint maximum-a-posteriori symbol-by-symbol detector with a least square channel estimator and tracker is substituted for the blind maximum likelihood detector and least square channel estimator.

6. The device of claim 4 where a Viterbi sequence detector with a per-survivor least square channel estimator and tracker is substituted for the blind maximum likelihood detector and least square channel estimator.

7. A device for separating uncoordinated co-channel signals of comparable power from a single received signal impaired by one or more of intersymbol interference, mutual interference, and additive noise, the device comprising:
- an analog to digital converter with an input and an output, a signal corresponding to the received signal available at the input and a digital form of said corresponding signal available at the output;
- wherein a sampling rate of the analog to digital converter exceeds a symbol rate corresponding to the received signal by a factor greater than or equal to two;
- an initial channel estimator coupled to the output of the analog to digital converter, said estimator for making an initial estimate of carrier frequency, carrier phase, delay, and impulse response of first and second signal channels transporting respective first and second signals;
- a decimator coupled to the output of the analog to digital converter and a block selector coupled to an output of the decimator;
- a blind maximum likelihood detector for utilizing initial channel estimator and block selector outputs to guess symbol sequences corresponding to the first and second signals;
- a least squares channel estimator for utilizing the guessed symbol sequences to estimate the carrier phase, delay, and impulse of the first and second signal channels;
- wherein the detector and least squares channel estimator are operative to iteratively estimate symbol sequences and channel state information until changes in one or more of carrier phase, delay, and impulse response indicate convergence; and,
- where convergence is indicated, metrics are available from the detector operative to indicate whether the guessed symbol sequences should be accepted, or rejected in favor of revising initial channel state information and restarting iterative symbol detection and channel estimation.

8. A device for separating uncoordinated co-channel signals of comparable power from a single received signal impaired by one or more of intersymbol interference, mutual interference and additive noise, the device comprising:
- a decimator coupled to an output of an analog to digital converter and a block selector coupled to an output of the decimator;
- a blind maximum likelihood detector for utilizing initial channel estimator and block selector outputs to detect symbol sequences corresponding to first and second signals;
- a least squares channel estimator for utilizing the detected symbol sequences to estimate a carrier phase, delay, and impulse of first and second channels;
- the detector and least squares channel estimator operative to iteratively estimate symbol sequences and channel state information until changes in one or more of carrier phase, delay, and impulse response indicate convergence; and,
- where convergence is indicated, metrics available from the detector operative to indicate whether the detected symbol sequences should be accepted, or rejected in favor of revising initial channel state information and restarting iterative symbol detection and channel estimation.

9. The device of claim 8 wherein a joint maximum-a-posteri symbol-by-symbol detector is substituted for the blind maximum likelihood detector.

10. The device of claim 9 wherein the channel estimation utilizes least mean square and tracking techniques.

11. The device of claim 9 wherein channel estimation utilizes recursive least square and tracking techniques.

12. The device of claim 8 wherein a Viterbi sequence detector is substituted for the blind maximum likelihood detector.

13. The device of claim 12 wherein channel estimation utilizes per-survivor least mean square and tracking techniques.

14. The device of claim 12 wherein channel estimation utilizes per-survivor recursive least square and tracking techniques.

* * * * *